United States Patent
Gong et al.

(10) Patent No.: US 11,399,088 B2
(45) Date of Patent: Jul. 26, 2022

(54) METHOD FOR ESTABLISHING COMMUNICATION CONNECTION AND RELATED PRODUCTS

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 2 days.

(21) Appl. No.: 17/138,837

(22) Filed: Dec. 30, 2020

(65) Prior Publication Data

US 2021/0120118 A1 Apr. 22, 2021

Related U.S. Application Data

(63) Continuation of application No. PCT/CN2019/090959, filed on Jun. 12, 2019.

(30) Foreign Application Priority Data

Jul. 2, 2018 (CN) .......................... 201810707332.1

(51) Int. Cl.
*H04M 1/72412* (2021.01)
*H04W 76/30* (2018.01)
(Continued)

(52) U.S. Cl.
CPC ...... *H04M 1/72412* (2021.01); *H04B 1/7156* (2013.01); *H04B 17/318* (2015.01);
(Continued)

(58) Field of Classification Search
CPC ............ H04M 1/72412; H04M 1/6066; H04B 1/7156; H04B 1/318; H04B 2001/71563;
(Continued)

(56) References Cited

U.S. PATENT DOCUMENTS 10,176,698 B1 * 1/2019 Buschmann ....... G08B 21/0277
10,432,773 B1 * 10/2019 Tong .................. H04M 1/6066
(Continued)

FOREIGN PATENT DOCUMENTS

CN 106257898 12/2016
CN 206350153 7/2017
(Continued)

OTHER PUBLICATIONS

WIPO, ISR and WO for PCT/CN2019/090959, Sep. 3, 2019.
(Continued)

*Primary Examiner* — Farid Seyedvosoghi
(74) *Attorney, Agent, or Firm* — Hodgson Russ LLP

(57) ABSTRACT

A method for establishing a communication connection and related products are provided. The method is applicable to a terminal. The terminal is in communication connection with a first earphone of wireless earphones. The first earphone is in communication connection with a second earphone of the wireless earphones. The method includes the following. A first distance between the terminal and the first earphone, a second distance between the terminal and the second earphone, and a third distance between the first earphone and the second earphone are determined. The communication connection between the terminal and the first earphone is disconnected when the first distance is greater than the second distance and the third distance is greater than or equal to a first threshold value. A communication connection between the terminal and the second earphone is established.

20 Claims, 4 Drawing Sheets

(51) Int. Cl.
*H04W 76/10* (2018.01)
*H04B 17/318* (2015.01)
*H04W 36/00* (2009.01)
*H04B 1/7156* (2011.01)
*H04M 1/60* (2006.01)
*H04W 68/02* (2009.01)

(52) U.S. Cl.
CPC ..... *H04M 1/6066* (2013.01); *H04W 36/0009* (2018.08); *H04W 36/00837* (2018.08); *H04W 68/02* (2013.01); *H04B 2001/71563* (2013.01)

(58) Field of Classification Search
CPC ....... H04W 36/0009; H04W 36/00837; H04W 68/02; H04W 76/30; H04W 76/10
See application file for complete search history.

(56) References Cited

U.S. PATENT DOCUMENTS

| 10,542,574 | B1* | 1/2020 | Jorgovanovic | ........ H04W 76/15 |
| 2008/0220825 | A1 | 9/2008 | Wu | |
| 2016/0373884 | A1* | 12/2016 | Peterson | ........... H04M 1/72412 |
| 2019/0096226 | A1* | 3/2019 | Buschmann | ........... G08B 21/22 |
| 2019/0098675 | A1* | 3/2019 | Paycher | ................. H04W 4/80 |

FOREIGN PATENT DOCUMENTS

| CN | 106998511 | 8/2017 |
| CN | 107071618 | 8/2017 |
| CN | 107145330 | 9/2017 |
| CN | 107205192 | 9/2017 |
| CN | 107708014 | 2/2018 |
| CN | 107819922 | 3/2018 |
| CN | 107885478 | 4/2018 |

OTHER PUBLICATIONS

SIPO, First Office Action for CN Application No. 201810707332.1, dated Feb. 25, 2020.
SIPO, Second Office Action for CN Application No. 201810707332.1, dated Jul. 20, 2020.
CNIPA, Decision of Rejection for CN Application No. 201810707332.1, dated Nov. 30, 2020.

* cited by examiner

METHOD FOR ESTABLISHING COMMUNICATION CONNECTION AND RELATED PRODUCTS

CROSS-REFERENCE TO RELATED APPLICATIONS

This application is a continuation of International Application No. PCT/CN2019/090959, filed on Jun. 12, 2019, which claims priority to Chinese Patent Application No. 201810707332.1, filed on Jul. 2, 2018, the entire disclosures of which are incorporated herein by reference.

TECHNICAL FIELD

This disclosure relates to the field of electronic technology, and more particularly to a method for establishing a communication connection and related products.

BACKGROUND

With wide spread of wireless technology, wireless connection can be supported by an increasing number of wireless devices. In practice, there may be a need to switch from communication connection with wireless device A to communication connection with wireless device B sometimes. Currently, such a switching process usually involves a series of manual operations of a user, for example, a previous communication connection is first disconnected and then a new communication connection is manually established, which results in a complicated switching process.

SUMMARY

Implementations provide a method for establishing a communication connection and related products.

In a first aspect, a method for establishing a communication connection is provided. The method is applicable to a terminal. The terminal is in communication connection with a first earphone of wireless earphones. The first earphones are in communication connection with a second earphone of the wireless earphones. The method includes the following. A first distance between the terminal and the first earphone, a second distance between the terminal and the second earphone, and a third distance between the first earphone and the second earphone are determined. The communication connection between the terminal and the first earphone is disconnected when the first distance is greater than the second distance and the third distance is greater than or equal to a first threshold value. A communication connection between the terminal and the second earphone is established.

In a second aspect, a terminal is provided. The terminal includes a processor, a memory, a communication interface, and one or more programs stored in the memory and executed by the processor. The one or more programs include instructions for performing the method described in the first aspect.

In a third aspect, a non-transitory computer-readable storage medium is provided. The non-transitory computer-readable storage medium is configured to store computer programs for electronic data interchange (EDI) which, when executed, are operable with a computer to perform some or all operations of the method described in the first aspect.

These and other aspects of the disclosure will be more concise and easier to understand in the description of the following implementations.

BRIEF DESCRIPTION OF THE DRAWINGS

In order to describe technical solutions of implementations more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

Detailed description will be given below.

The terms "first", "second", "third", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Figure 1:
FIG. 1 is a schematic structural diagram of a system for establishing a communication connection according to implementations.

FIG. 1 is a schematic structural diagram of a system for establishing a communication connection according to implementations. The system includes a terminal and wireless earphones. The wireless earphones include a first earphone and a second earphone. At least one of the wireless earphones is in communication connection with the terminal through wireless technology such as Bluetooth, infrared, etc.

The terminal may include various handheld devices, in-vehicle devices, wearable devices, computing devices that have wireless communication functions or other processing devices connected to a wireless modem, as well as various forms of user equipments (UE), mobile stations (MS), terminal devices, and the like.

An operating principle of the system for establishing a communication connection is as follows. The terminal is in communication connection with the first earphone, and the first earphone is in communication connection with the second earphone. The terminal determines a first distance between the terminal and the first earphone, a second distance between the terminal and the second earphone, and a third distance between the first earphone and the second earphone. When the first distance is greater than the second distance and the third distance is greater than or equal to a first threshold value, the terminal disconnects the communication connection between the terminal and the first earphone and establishes a communication connection with the second earphone. As such, it is possible to intelligently establish a new communication connection without manual operations of a user, thereby improving communication connection efficiency.

Figure 2:
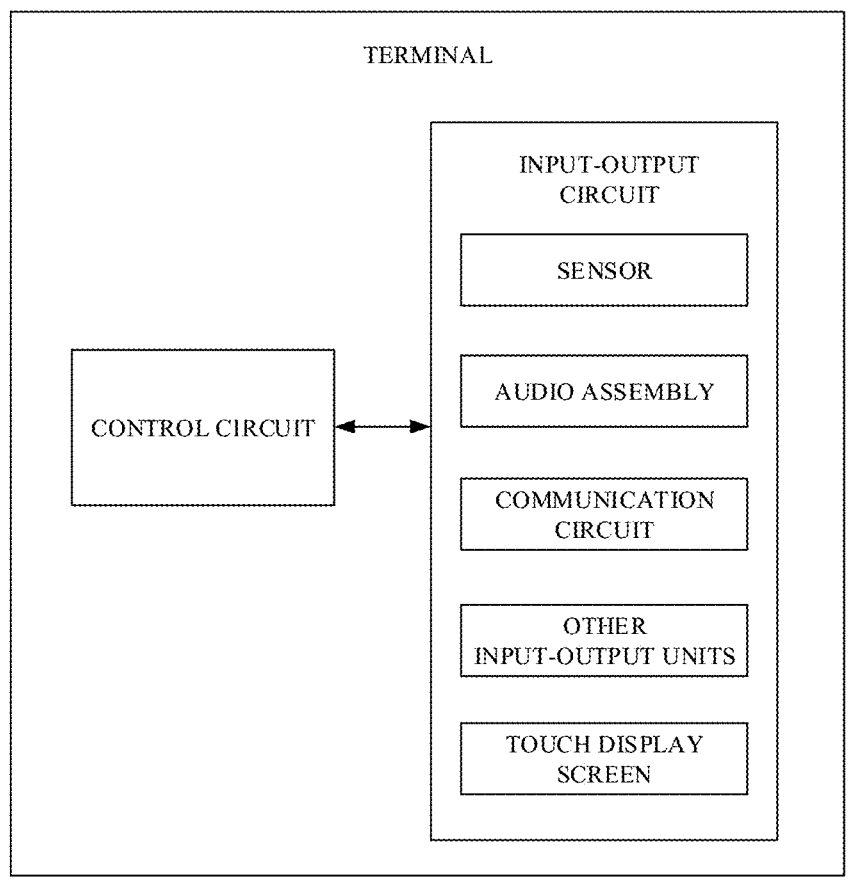
FIG. 2 is a schematic structural diagram of a terminal according to implementations.

FIG. 2 is a schematic structural diagram of a terminal according to implementations. The terminal includes a control circuit and an input-output circuit. The input-output circuit is coupled with the control circuit.

The control circuit can include a store-and-process circuit. The store-and-process circuit has a storing circuit which may be a memory, such as a hard drive memory, a non-transitory memory (such as a flash memory, other electronically programmable read-only memories used to form a solid-state drive, or the like), a transitory memory (such as a static random access memory, a dynamic random access memory, or the like), or the like, and the disclosure is not limited in this regard. The store-and-process circuit has a processing circuit to control operations of the terminal. The processing circuit can be implemented based on one or more microprocessors, microcontrollers, digital signal processors, baseband processors, power management units, audio codec chips, application-specific integrated circuits, display driver integrated circuits, or the like.

The store-and-process circuit can be configured to run software of the terminal, for example, a communication processing application, a data transmission application, a distance determining application, a received signal strength indicator (RSSI) value determining application, a media playback application, a voice over Internet protocol (VOIP) phone call application, an operating system function, etc. These applications can be used to perform some control operations such as establishing a communication connection, disconnecting communication connection, determining a distance between the terminal and a first earphone of wireless earphones, determining a distance between the terminal and a second earphone of the wireless earphones, determining a distance between the first earphone and the second earphone, determining an RSSI value of a signal between the first earphone and the terminal, determining an RSSI value of a signal between the first earphone and the second earphone, determining an RSSI value of a signal between the second earphone and the terminal, playing media files, making a voice phone call, and other functions, which is not limited herein.

The input-output circuit can be configured to achieve data input and data output of the terminal, that is, to allow the terminal to receive data from an external device and also allow the terminal to output data to an external device.

The input-output circuit can further include a sensor. The sensor can include an ambient light sensor, an optical or capacitive infrared proximity sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors.

The input-output circuit can further include one or more displays. The displays may include one or more of a liquid crystal display, an organic light emitting diode (OLED) display, an electronic ink display, a plasma display, displays based on other display technologies. As an example, the display includes an array of touch sensors (i.e., the display can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations are not limited thereto.

The input-output circuit can further include an audio assembly. The audio assembly is configured to provide the terminal with audio input and output functions. The audio assembly may include ultrasonic transceivers, buzzers, tone generators, and other assemblies for generating and detecting sound. The ultrasonic transceiver may be a microphone for transmitting and receiving sound.

The input-output circuit can further include a communication circuit. The communication circuit is configured to provide the terminal with the ability to communicate with external devices. For instance, the communication circuit includes analog/digital input-output interface circuits and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. The communication circuit may include an NFC antenna and an NFC transceiver. The communication circuit may further include transceivers and antennas for cellular telephone, transceiver circuits and antennas for wireless local area network, and the like.

The input-output circuit can further include other input-output units. The other input-output units may include buttons, joysticks, click wheels, scroll wheels, touch pads, keypads, keyboards, cameras, LEDs, and other status indicators.

The terminal may further include a battery (not illustrated in FIG. 2) for powering the terminal.

Figure 3:
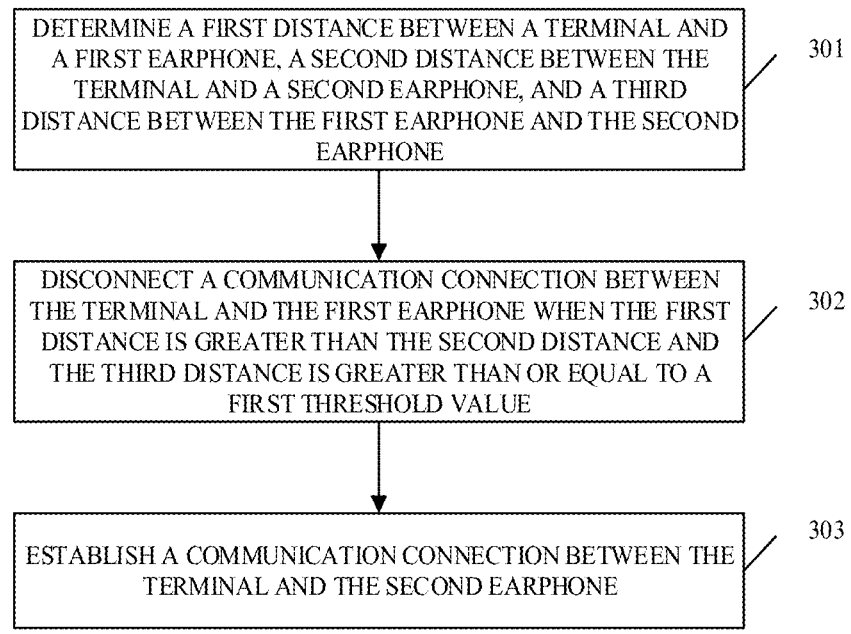
FIG. 3 is a schematic flowchart of a method for establishing a communication connection according to implementations.

FIG. 3 is a schematic flowchart of a method for establishing a communication connection according to implementations. The method is applicable to the terminal described above. The terminal is in communication connection with a first earphone of wireless earphones. The first earphone is in communication connection with a second earphone of the wireless earphones. The method includes the following.

At block 301, the terminal determines a first distance between the terminal and the first earphone, a second distance between the terminal and the second earphone, and a third distance between the first earphone and the second earphone.

In some implementations, the terminal determines the first distance between the terminal and the first earphone, the second distance between the terminal and the second earphone, and the third distance between the first earphone and the second earphone as follows. The terminal determines a third position of the terminal and acquires a first position of the first earphone and a second position of the second earphone. The terminal determines the first distance according to the first position and the third position, determines the second distance according to the second position and the third position, and determines the third distance according to the first position and the second position.

For an example, the terminal can determine, on its own, a position of the terminal directly through wireless-fidelity (WiFi) positioning technology, but is unable to determine, on its own, a position of the first earphone and a position of the second earphone through WiFi positioning technology.

The terminal can acquire the position of the first earphone and the position of the second earphone as follows. The second earphone determines the position of the second earphone through WiFi positioning technology, and reports periodically to the first earphone the position of the second earphone. The first earphone, upon receiving the position of the second earphone reported by the second earphone, determines the position of the first earphone through WiFi positioning technology, and reports to the terminal the position of the first earphone and the position of the second earphone. The terminal receives the position of the first earphone and the position of the second earphone that are reported by the first earphone.

The terminal can determine the third position of the terminal as follows. Upon receiving the position of the first earphone and the position of the second earphone reported by the first earphone, the terminal determines the position of the terminal through WiFi positioning technology.

It should be noted that, according to implementations herein, the terminal can first determine the third position and then acquire the first position and the second position, which is not limited herein. While performing WiFi positioning technology, the terminal, the first earphone, and the second earphone share one wireless access point. The third position of the terminal, the first position of the first earphone, and the second position of the second earphone each are expressed by coordinates. A distance between two points can be determined as long as a position of each of the two points is known, which belongs to the related art and thus will not be elaborated herein.

The terminal can determine the position of the terminal, the first earphone can determine the position of the first earphone, and the second earphone can determine the position of the second earphone in other way, which is not limited herein.

In some implementations, the terminal determines the first distance between the terminal and the first earphone, the second distance between the terminal and the second earphone, and the third distance between the first earphone and the second earphone as follows. The terminal determines a first RSSI value of a signal between the first earphone and the terminal, and determines the first distance according to the first RSSI value. The terminal acquires a second RSSI value of a signal between the second earphone and the terminal, and determines the second distance according to the second RSSI value. The terminal acquires a third RSSI value of a signal between the first earphone and the second earphone, and determines the third distance according to the third RSSI value.

Since the terminal is connected with the first earphone, the terminal can determine directly the first RSSI value of a signal between the terminal and the first earphone. However, the terminal is unable to determine directly the second RSSI value of a signal between the terminal and the second earphone and the third RSSI value of a signal between the first earphone and the second earphone.

The terminal can acquire the third RSSI value of a signal between the first earphone and the second earphone as follows. The first earphone determines the third RSSI value of a signal between the first earphone and the second earphone. The first earphone sends the third RSSI value to the terminal. The terminal receives the third RSSI value from the first earphone. Alternatively, the terminal sends to the first earphone a request for acquiring RSSI value. Upon receiving the request for acquiring RSSI value, the first earphone determines the third RSSI value of a signal between the first earphone and the second earphone and sends the third RSSI value to the terminal. The terminal receives the third RSSI value from the first earphone.

The terminal can acquire the second RSSI value of a signal between the terminal and the second earphone as follows. The second earphone sends periodically a Bluetooth low energy (BLE) broadcast to the terminal by means of BLE broadcast. The terminal, upon receiving the BLE broadcast from the second earphone, can acquire the second RSSI value of a signal between the second earphone and the terminal.

The terminal can determine a distance according to an RSSI value as follows. The terminal determines, according to a mapping relationship between distances and RSSI values, a distance corresponding to the RSSI value. In the mapping relationship between distances and RSSI values, the RSSI value is inversely proportional to the distance, that is, a high RSSI value corresponds to a short distance, and a low RSSI value corresponds to a long distance.

The terminal may determine the first distance, the second distance, and the third distance in the following order. The terminal, upon receiving the BLE broadcast from the second earphone, acquires the second RSSI value. The terminal first determines the second distance according to the second RSSI value. The terminal sends to the first earphone the request for acquiring RSSI value. The first earphone, upon receiving the request for acquiring RSSI value, determines the third RSSI value and sends the third RSSI value to the terminal. The terminal, upon receiving the third RSSI value from the first earphone, determines the third distance according to the third RSSI value. The terminal determines the first RSSI value and then determines the first distance according to the first RSSI value.

Alternatively, the terminal can first determine the first distance, then determine the second distance, and finally determine the third distance, or first determine the third distance, then determine the first distance, and finally determine the second distance, and the disclosure is not limited in this regard.

At block 302, the terminal disconnects the communication connection between the terminal and the first earphone, when the first distance is greater than the second distance and the third distance is greater than or equal to a first threshold value.

In some implementations, the first distance is greater than or equal to a second threshold value, and the second distance is less than the second threshold value.

The first threshold value and the second threshold value can be set by a user or the terminal, which is not limited herein.

The terminal can disconnect the communication connection between the terminal and the first earphone as follows. The terminal sends to the first earphone a request for disconnecting communication connection. The first earphone, upon receiving the request for disconnecting communication connection, sends to the terminal a disconnection response in response to the request for disconnecting communication connection. The terminal receives the disconnection response and disconnects the communication connection between the terminal and the first earphone.

At block 303, the terminal establishes a communication connection between the terminal and the second earphone.

In some implementations, the terminal establishes the communication connection between the terminal and the second earphone as follows. The terminal sends a first paging request at a predetermined frequency band. The terminal receives a first paging response, where the first paging response is sent by the second earphone at the predetermined frequency band in response to the first paging request. The terminal sends to the second earphone a second paging request at the predetermined frequency band, where the second paging request carries frequency-hopping sequence information and clock phase information of the terminal, the frequency-hopping sequence information is used for adjusting a frequency band of the second earphone, and the clock phase information is used for adjusting a time-frequency location of the second earphone. The second earphone receives the second paging request. The second earphone adjusts a frequency band of the second earphone according to the frequency-hopping sequence information carried by the second paging request, and adjusts a time-frequency location of the second earphone according to the clock phase information carried by the second paging request. The terminal receives a second paging response, thus completing establishing the communication connection, where the second paging response is sent by the second earphone at the predetermined frequency band in response to the second paging request.

The predetermined frequency band may be the frequency band of the second earphone, or a frequency band that can be monitored by the second earphone, or an agreed frequency band between the second earphone and the terminal, which is not limited herein.

The frequency-hopping sequence information refers to a code sequence for controlling hopping of a carrier frequency. The frequency-hopping sequence information is mainly used to control frequency hopping of a carrier within a frequency band. When frequency hopping is performed within one frequency band, the frequency hopping sequence information is the only indicator for distinguishing users. The clock phase information is mainly indicative of a start time and an end time of sending data and a start time and an end time of reading data.

According to implementations herein, the terminal is first connected with the first earphone. When the first distance between the terminal and the first earphone is greater than the second distance between the terminal and the second earphone, and the third distance between the first earphone and the second earphone is greater than or equal to a threshold value, the terminal disconnects from the first earphone and establishes the communication connection between the terminal and the second earphone without manual operations of the user, which is conducive to efficiency in establishing a communication connection.

In some implementations, before disconnecting the communication connection between the terminal and the first earphone, the following can be performed. The terminal determines that an RSSI value of a signal between the terminal and the first earphone is less than or equal to a third threshold value.

The third threshold value can be set by the user or the terminal, which is not limited herein.

A long distance between the first earphone and the terminal is not necessarily indicative of a low transmission efficiency between the terminal and the first earphone. Therefore, before disconnecting the communication connection between the terminal and the first earphone, the terminal determines whether the RSSI value of the signal between the terminal and the first earphone is less than or equal to the third threshold value so as to determine whether it is necessary to disconnect the communication connection, thereby improving accuracy in establishing a new communication connection.

In some examples, after the terminal establishes the communication connection between the terminal and the second earphone, the following can be performed. The terminal sends audio data to the second earphone. The second earphone receives the audio data from the terminal. When the third distance is less than or equal to the first threshold value, the second earphone copies the audio data and sends the copied audio data to the first earphone.

In some examples, the method further includes the following. When the first distance is greater than the second distance, each of the first distance and the second distance is greater than or equal to the second threshold value, and the terminal currently has no data that are to be transmitted to the first earphone, the terminal disconnects the communication connection between the terminal and the first earphone.

As such, when a distance between the terminal and each of the first earphone and the second earphone is long, and the terminal currently has no data that are to be transmitted to the first earphone, the terminal can directly disconnect the communication connection between the terminal and the first earphone, nor does the terminal need to establish the communication connection between the terminal and the second earphone, which reduces power consumption of the terminal.

In some examples, before the terminal disconnects the communication connection between the terminal and the first earphone, the following can be performed. The terminal sends to the first earphone a reminder message. The reminder message is used to remind the user of a long distance between the terminal and each of the first earphone and the second earphone and no audio data to be transmitted to the first earphone, and to ask the user whether to disconnect the communication connection between the terminal and the first earphone. The first earphone receives the reminder message, and generates a voice reminder according to the reminder message. Upon receiving a confirmation operation inputted by the user in response to the reminder message, the first earphone sends a confirmation instruction to the terminal in response to the reminder message. Upon receiving the confirmation instruction, the terminal disconnects the communication connection between the terminal and the first earphone.

As such, before disconnecting the communication connection between the terminal and the first earphone, the terminal inquires the user whether to disconnect the communication connection, which is possible to achieve a human-machine interaction function, thereby improving user experience.

In some implementations, the method further includes the following. The terminal sends to the first earphone a first reminder message for reminding the user of a long distance between the first earphone and the terminal and reminding the user to shorten the distance between the first earphone and the terminal, when the first distance is greater than the second distance, each of the first distance and the second distance is greater than or equal to the second threshold value, and there are data to be transmitted to the first earphone. Upon receiving the first reminder message, the first earphone generates a voice reminder according to the first reminder message.

In this way, when the distance between the terminal and each of the first earphone and the second earphone is long and the terminal has data that are to be transmitted to the first earphone, the first earphone generates a voice reminder, to remind the user of a long distance between the first earphone and the terminal and remind the user to shorten the distance between the first earphone and the terminal, which is possible to guarantee data transmission efficiency.

In some implementations, before sending to the first earphone the first reminder message, the following can be performed. The terminal determines that the first earphone is in a wearing state.

The terminal can determine whether the first earphone is in the wearing state as follows. The terminal sends to the first earphone a first request for wearing-state acquisition. The first earphone, upon receiving the first request for wearing-state acquisition, determines whether the first earphone is in the wearing state, and then sends to the terminal a message indicative of a wearing/non-wearing state determined in response to the first request for wearing-state acquisition. The terminal receives from the first earphone the message indicative of a wearing/non-wearing state.

For an example, the first earphone can include a heart rate sensor and a body temperature sensor. When each heart rate detected by the heart rate sensor within a first time period matches a heart rate of a human body, and/or each body temperature detected by the body temperature sensor within a second time period matches a body temperature of a human body, the first earphone determines that the first earphone is in the wearing state; otherwise, the first earphone determines that the first earphone is in a non-wearing state. Whether the first earphone is worn can be determined in other ways, which is not limited herein.

Therefore, according to implementations herein, an earphone generates a voice reminder only when the earphone is in the wearing state, which improves efficiency in receiving the voice reminder.

In some implementations, the method includes the following. The terminal determines whether the second earphone is in the wearing state, when the first earphone is in the non-wearing state. The terminal sends to the second earphone a second reminder message for reminding the user to shorten the distance between the first earphone and the terminal, when the second earphone is in the wearing state. Specifically, the terminal can send to the second earphone the second reminder message as follows. The terminal can send the second reminder message to the first earphone and the first earphone forwards the second reminder message to the second earphone.

The terminal can determine whether the second earphone is in the wearing state as follows. The terminal sends to the second earphone a second request for wearing-state acquisition. The second earphone, upon receiving the second request for wearing-state acquisition, determines whether the second earphone is in the wearing state, and then sends to the terminal a message indicative of a wearing/non-wearing state determined in response to the second request for wearing-state acquisition. The terminal receives from the second earphone the message indicative of a wearing/non-wearing state. During the processes of sending to the second earphone the second request for wearing-state acquisition by the terminal and sending to the terminal the message indicative of a wearing/non-wearing state by the second earphone, the first earphone can be configured as a relay that is used to forward a request or a message sent form the terminal to the second earphone or sent from the second earphone to the terminal.

The second earphone can include a heart rate sensor and a body temperature sensor. When each heart rate detected by the heart rate sensor within a third time period matches a heart rate of a human body, and/or each body temperature detected by the body temperature sensor within a fourth time period matches a body temperature of a human body, the second earphone determines that the second earphone is in the wearing state; otherwise, the second earphone determines that the second earphone is in a non-wearing state.

Therefore, according to implementations herein, an earphone generates a voice reminder only when the earphone is in the wearing state, which improves efficiency in receiving the voice reminder.

Figure 4:
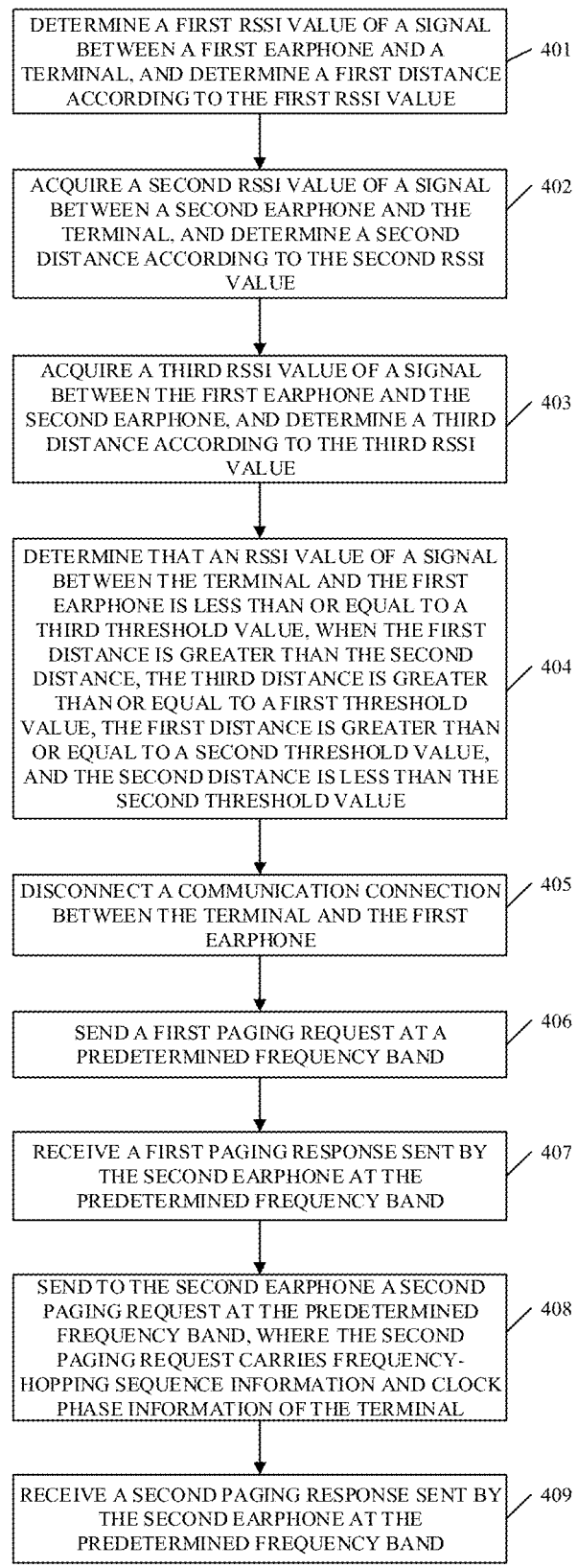
FIG. 4 is a schematic flowchart of a method for establishing a communication connection according to other implementations.

Implementations further provide a more detailed flowchart of a method for establishing a communication connection. As illustrated in FIG. 4, the method is applicable to a terminal. The terminal is in communication connection with a first earphone of wireless earphones. The first earphone is in communication connection with a second earphone of the wireless earphones. The method includes the following.

At block 401, the terminal determines a first RSSI value of a signal between the first earphone and the terminal, and determines a first distance according to the first RSSI value.

At block 402, the terminal acquires a second RSSI value of a signal between the second earphone and the terminal, and determines a second distance according to the second RSSI value.

At block 403, the terminal acquires a third RSSI value of a signal between the first earphone and the second earphone, and determines a third distance according to the third RSSI value.

At block 404, the terminal determines that an RSSI value of a signal between the terminal and the first earphone is less than or equal to a third threshold value, when the first distance is greater than the second distance, the third distance is greater than or equal to a first threshold value, the first distance is greater than or equal to a second threshold value, and the second distance is less than the second threshold value.

At block 405, the terminal disconnects the communication connection between the terminal and the first earphone.

At block 406, the terminal sends a first paging request at a predetermined frequency band.

At block 407, the terminal receives a first paging response, where the first paging response is sent by the second earphone at the predetermined frequency band in response to the first paging request.

At block 408, the terminal sends to the second earphone a second paging request at the predetermined frequency band, where the second paging request carries frequency-hopping sequence information and clock phase information of the terminal, the frequency-hopping sequence information is used for adjusting a frequency band of the second earphone, and the clock phase information is used for adjusting a time-frequency location of the second earphone.

At block 409, the terminal receives a second paging response, thus completing establishing the communication connection, where the second paging response is sent by the second earphone at the predetermined frequency band in response to the second paging request.

It should be noted that, for details of the implementation process of each step of the method illustrated in FIG. 4, reference can be made to the foregoing implementations, which will not be repeated herein.

Figure 5:
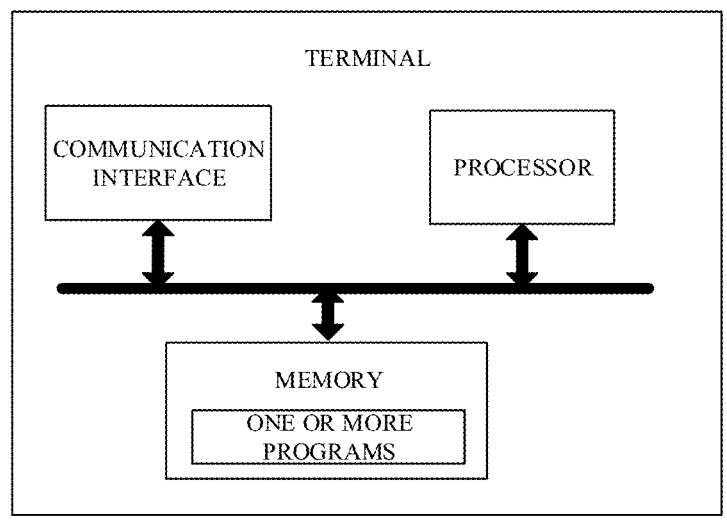
FIG. 5 is a schematic structural diagram of a terminal according to other implementations.

Similar to implementations illustrated in FIG. 3 and FIG. 4, FIG. 5 is a schematic structural diagram of a terminal according to other implementations. The terminal is in communication connection with a first earphone of wireless earphones. The first earphone is in communication connection with a second earphone of the wireless earphones. As illustrated in FIG. 5, the terminal includes a processor, a memory, a communication interface, and one or more programs stored in the memory and executed by the processor. The one or more programs include instructions for performing the following operations. A first distance between the terminal and the first earphone, a second distance between the terminal and the second earphone, and a third distance between the first earphone and the second earphone are determined. The communication connection between the terminal and the first earphone is disconnected when the first distance is greater than the second distance and the third distance is greater than or equal to a first threshold value. A communication connection between the terminal and the second earphone is established.

In some implementations, the first distance is greater than or equal to a second threshold value, and the second distance is less than the second threshold value.

In some implementations, in terms of establishing the communication connection between the terminal and the second earphone, the one or more programs include instructions for performing the following operations. A first paging request is sent at a predetermined frequency band. A first paging response is received, where the first paging response is sent by the second earphone at the predetermined frequency band in response to the first paging request. A second paging request is sent to the second earphone at the predetermined frequency band, where the second paging request carries frequency-hopping sequence information and clock phase information of the terminal, the frequency-hopping sequence information is used for adjusting a frequency band of the second earphone, and the clock phase information is used for adjusting a time-frequency location of the second earphone. A second paging response is received and thus establishment of the communication connection is completed, where the second paging response is sent by the second earphone at the predetermined frequency band in response to the second paging request.

In some implementations, in terms of determining the first distance between the terminal and the first earphone, the second distance between the terminal and the second earphone, and the third distance between the first earphone and the second earphone, the one or more programs include instructions for performing the following operations. A third position of the terminal is determined. A first position of the first earphone and a second position of the second earphone are acquired. The first distance is determined according to the first position and the third position, the second distance is determined according to the second position and the third position, and the third distance is determined according to the first position and the second position.

In some implementations, in terms of determining the first distance between the terminal and the first earphone, the second distance between the terminal and the second earphone, and the third distance between the first earphone and the second earphone, the one or more programs include instructions for performing the following operations. A first RSSI value of a signal between the first earphone and the terminal is determined, and the first distance is determined according to the first RSSI value. A second RSSI value of a signal between the second earphone and the terminal is acquired, and the second distance is determined according to the second RSSI value. A third RSSI value of a signal between the first earphone and the second earphone is acquired, and the third distance is determined according to the third RSSI value.

In some implementations, the one or more programs further include instructions for performing the following operations before disconnecting the communication connection between the terminal and the first earphone. An RSSI value of a signal between the terminal and the first earphone is determined to be less than or equal to a third threshold value.

In some implementations, the one or more programs further include instructions for performing the following operations. A first reminder message is sent to the first earphone, when the first distance is greater than the second distance, each of the first distance and the second distance is greater than or equal to the second threshold value, and there are data to be transmitted to the first earphone, where the first reminder message is used for instruct the first earphone to generate a voice reminder according to the first reminder message and the voice reminder is used for reminding a user to shorten a distance between the first earphone and the terminal.

In some implementations, the one or more programs further include instructions for performing the following operations before sending to the first earphone the first reminder message. The first earphone is determined to be in a wearing state.

In some implementations, the one or more programs further include instructions for performing the following operations. Whether the second earphone is in the wearing state is determined when the first earphone is in a non-wearing state. A second reminder message is sent to the second earphone, when the second earphone is in the wearing state, where the second reminder message is used for instruct the second earphone to generate the voice reminder for reminding the user to shorten the distance between the first earphone and the terminal.

It should be noted that, for details of the implementation process, reference can be made to the foregoing implementations, which will not be repeated herein.

Figure 6:
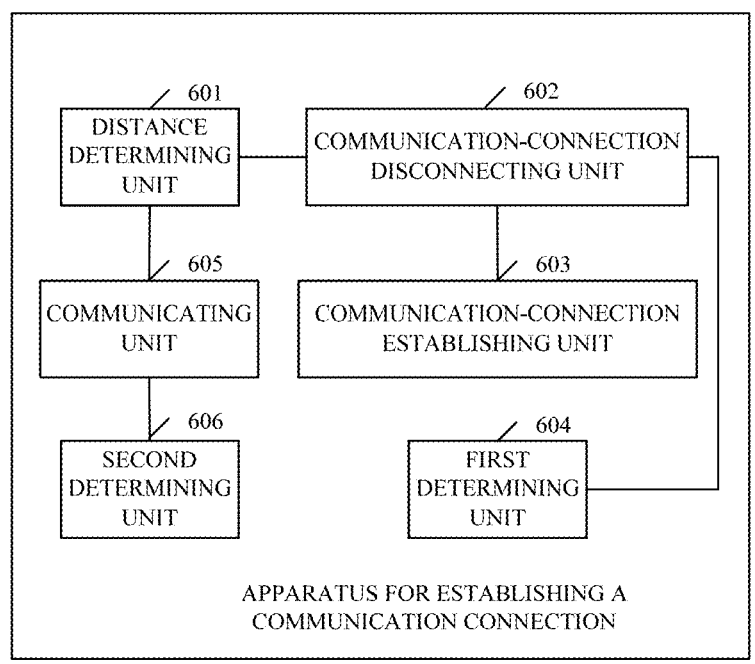
FIG. 6 is a schematic structural diagram of an apparatus for establishing a communication connection according to implementations.

FIG. 6 is a schematic structural diagram of an apparatus for establishing a communication connection according to implementations. The apparatus is applicable to a terminal. The terminal is in communication connection with a first earphone of wireless earphones. The first earphone is in communication connection with a second earphone of the wireless earphones. The apparatus includes a distance determining unit 601, a communication-connection disconnecting unit 602, and a communication-connection establishing unit 603. The distance determining unit 601 is configured to determine a first distance between the terminal and the first earphone, a second distance between the terminal and the second earphone, and a third distance between the first earphone and the second earphone. The communication-connection disconnecting unit 602 is configured to disconnect the communication connection between the terminal and the first earphone when the first distance is greater than the second distance and the third distance is greater than or equal to a first threshold value. The communication-connection establishing unit 603 is configured to establish a communication connection between the terminal and the second earphone.

In some implementations, the first distance is greater than or equal to a second threshold value, and the second distance is less than the second threshold value.

In some implementations, in terms of establishing the communication connection between the terminal and the second earphone, the communication-connection establishing unit 603 is configured to operate as follows. The communication-connection establishing unit 603 is configured to send a first paging request at a predetermined frequency band. The communication-connection establishing unit 603 is configured to receive a first paging response, where the first paging response is sent by the second earphone at the predetermined frequency band in response to the first paging request. The communication-connection establishing unit 603 is configured to send to the second earphone a second paging request at the predetermined frequency band, where the second paging request carries frequency-hopping sequence information and clock phase information of the terminal, the frequency-hopping sequence information is used for adjusting a frequency band of the second earphone, and the clock phase information is used for adjusting a time-frequency location of the second earphone. The communication-connection establishing unit 603 is configured to receive a second paging response, thereby completing establishing the communication connection, where the second paging response is sent by the second earphone at the predetermined frequency band in response to the second paging request.

In some implementations, in terms of determining the first distance between the terminal and the first earphone, the second distance between the terminal and the second earphone, and the third distance between the first earphone and the second earphone, the distance determining unit 601 is configured to operate as follows. The distance determining unit 601 is configured to determine a third position of the terminal, and acquire a first position of the first earphone and a second position of the second earphone. The distance determining unit 601 is configured to determine the first distance according to the first position and the third position, determine the second distance according to the second position and the third position, and determine the third distance according to the first position and the second position.

In some implementations, in terms of determining the first distance between the terminal and the first earphone, the second distance between the terminal and the second earphone, and the third distance between the first earphone and the second earphone, the distance determining unit 601 is configured to operate as follows. The distance determining unit 601 is configured to determine a first RSSI value of a signal between the first earphone and the terminal, and determine the first distance according to the first RSSI value. The distance determining unit 601 is configured to acquire a second RSSI value of a signal between the second earphone and the terminal, and determine the second distance according to the second RSSI value. The distance determining unit 601 is configured to acquire a third RSSI value of a signal between the first earphone and the second earphone, and determine the third distance according to the third RSSI value.

In some implementations, the apparatus further includes a first determining unit 604. The first determining unit 604 is configured to determine that an RSSI value of a signal between the terminal and the first earphone is less than or equal to a third threshold value.

In some implementations, the apparatus further includes a communicating unit 605. The communicating unit 605 is configured to send to the first earphone a first reminder message, when the first distance is greater than the second distance, each of the first distance and the second distance is greater than or equal to the second threshold value, and there are data to be transmitted to the first earphone, where the first reminder message is used for instruct the first earphone to generate a voice reminder according to the first reminder message and the voice reminder is used for reminding a user to shorten a distance between the first earphone and the terminal.

In some implementations, the apparatus further includes a second determining unit 606. The second determining unit 606 is configured to determine that the first earphone is in a wearing state before the communicating unit 605 sends to the first earphone the first reminder message.

In some implementations, the second determining unit 606 is further configured to determine whether the second earphone is in the wearing state when the first earphone is in a non-wearing state. The communicating unit 605 is further configured to send to the second earphone a second reminder message when the second earphone is in the wearing state, wherein the second reminder message is used for instruct the second earphone to generate the voice reminder for reminding the user to shorten the distance between the first earphone and the terminal.

It should be noted that, the wearable device described herein are implemented as functional units. The term "unit" referred to herein should be understood as the broadest meaning as possible, and an object for implementing functions defined by each "unit" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

The distance determining unit 601, the first determining unit 604, and the second determining unit 606 may be the control circuit or the processor. The communication-connection disconnecting unit 602, the communication-connection establishing unit 603, and the communicating unit 605 may be the communication interface or the input-output circuit.

Implementations further provide a non-transitory computer-readable storage medium. The non-transitory computer-readable storage medium is configured to store computer programs for electronic data interchange (EDI) which, when executed, are operable with a computer to perform some or all operations of any one of the foregoing method implementations. The computer includes a terminal.

Implementations further provide a computer program product. The computer program product includes a non-transitory computer-readable storage medium that stores computer programs. The computer programs are operable with a computer to execute some or all operations of any one of the foregoing method implementations. The computer program product may be a software installation package. The computer includes a terminal.

It is to be noted that, for the sake of simplicity, the foregoing method implementations are described as a series of action combinations, however, it will be appreciated by those skilled in the art that the present disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the present disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc, to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for establishing a communication connection, being applicable to a terminal, the terminal being in communication connection with a first earphone of wireless earphones, the first earphone being in communication connection with a second earphone of the wireless earphones, and the method comprising:
    determining a first distance between the terminal and the first earphone, a second distance between the terminal and the second earphone, and a third distance between the first earphone and the second earphone;
    disconnecting the communication connection between the terminal and the first earphone when the first distance is greater than the second distance and the third distance is greater than or equal to a first threshold value; and
    establishing a communication connection between the terminal and the second earphone.

2. The method of claim 1, wherein the first distance is greater than or equal to a second threshold value, and the second distance is less than the second threshold value.

3. The method of claim 2, further comprising:
    sending to the first earphone a first reminder message, when the first distance is greater than the second distance, each of the first distance and the second distance is greater than or equal to the second threshold value, and there are data to be transmitted to the first earphone, wherein the first reminder message is used for instruct the first earphone to generate a voice reminder according to the first reminder message and the voice reminder is used for reminding a user to shorten a distance between the first earphone and the terminal.

4. The method of claim 3, further comprising:
    before sending to the first earphone the first reminder message, determining that the first earphone is in a wearing state.

5. The method of claim 4, further comprising:
    determining whether the second earphone is in the wearing state when the first earphone is in a non-wearing state;
    sending to the second earphone a second reminder message when the second earphone is in the wearing state, wherein the second reminder message is used for instruct the second earphone to generate the voice reminder for reminding the user to shorten the distance between the first earphone and the terminal.

6. The method of claim 1, wherein establishing the communication connection between the terminal and the second earphone comprises:
    sending a first paging request at a predetermined frequency band;
    receiving a first paging response, wherein the first paging response is sent by the second earphone at the predetermined frequency band in response to the first paging request;
    sending to the second earphone a second paging request at the predetermined frequency band, wherein the second paging request carries frequency-hopping sequence information and clock phase information of the terminal, the frequency-hopping sequence information is used for adjusting a frequency band of the second earphone, and the clock phase information is used for adjusting a time-frequency location of the second earphone; and receiving a second paging response and completing establishing the communication connection, wherein the second paging response is sent by the second earphone at the predetermined frequency band in response to the second paging request.

7. The method of claim 1, wherein determining the first distance between the terminal and the first earphone, the second distance between the terminal and the second earphone, and the third distance between the first earphone and the second earphone comprises:
determining a third position of the terminal;
acquiring a first position of the first earphone and a second position of the second earphone; and
determining the first distance according to the first position and the third position, determining the second distance according to the second position and the third position, and determining the third distance according to the first position and the second position.

8. The method of claim 1, wherein determining the first distance between the terminal and the first earphone, the second distance between the terminal and the second earphone, and the third distance between the first earphone and the second earphone comprises:
determining a first received signal strength indicator (RSSI) value of a signal between the first earphone and the terminal, and determining the first distance according to the first RSSI value;
acquiring a second RSSI value of a signal between the second earphone and the terminal, and determining the second distance according to the second RSSI value; and
acquiring a third RSSI value of a signal between the first earphone and the second earphone, and determining the third distance according to the third RSSI value.

9. The method of claim 1, further comprising:
before disconnecting the communication connection between the terminal and the first earphone,
determining that an RSSI value of a signal between the terminal and the first earphone is less than or equal to a third threshold value.

10. A terminal comprising a processor, a memory, a communication interface, and one or more programs stored in the memory, which, when executed by the processor, are operable with the processor to:
determine a first distance between the terminal and a first earphone of wireless earphones, a second distance between the terminal and a second earphone of the wireless earphones, and a third distance between the first earphone and the second earphone, wherein the terminal is in communication connection with the first earphone and the first earphone is in communication connection with the second earphone;
disconnect the communication connection between the terminal and the first earphone when the first distance is greater than the second distance and the third distance is greater than or equal to a first threshold value; and
establish a communication connection between the terminal and the second earphone.

11. The terminal of claim 10, wherein the first distance is greater than or equal to a second threshold value, and the second distance is less than the second threshold value.

12. The terminal of claim 11, wherein the one or more programs are further operable with the processor to:
send to the first earphone a first reminder message, when the first distance is greater than the second distance, each of the first distance and the second distance is greater than or equal to the second threshold value, and there are data to be transmitted to the first earphone, wherein the first reminder message is used for instruct the first earphone to generate a voice reminder according to the first reminder message and the voice reminder is used for reminding a user to shorten a distance between the first earphone and the terminal.

13. The terminal of claim 12, wherein the one or more programs are further operable with the processor to:
determine that the first earphone is in a wearing state before the first reminder message is sent to the first earphone.

14. The terminal of claim 13, wherein the one or more programs are further operable with the processor to:
determine whether the second earphone is in the wearing state when the first earphone is in a non-wearing state; and
send to the second earphone a second reminder message when the second earphone is in the wearing state, wherein the second reminder message is used for instruct the second earphone to generate the voice reminder for reminding the user to shorten the distance between the first earphone and the terminal.

15. The terminal of claim 10, wherein the one or more programs operable with the processor to establish the communication connection between the terminal and the second earphone are operable with the processor to:
send a first paging request at a predetermined frequency band;
receive a first paging response, wherein the first paging response is sent by the second earphone at the predetermined frequency band in response to the first paging request;
send to the second earphone a second paging request at the predetermined frequency band, wherein the second paging request carries frequency-hopping sequence information and clock phase information of the terminal, the frequency-hopping sequence information is used for adjusting a frequency band of the second earphone, and the clock phase information is used for adjusting a time-frequency location of the second earphone; and
receive a second paging response and complete establishing the communication connection, wherein the second paging response is sent by the second earphone at the predetermined frequency band in response to the second paging request.

16. The terminal of claim 10, wherein the one or more programs operable with the processor to determine the first distance between the terminal and the first earphone, the second distance between the terminal and the second earphone, and the third distance between the first earphone and the second earphone are operable with the processor to:
determine a third position of the terminal;
acquire a first position of the first earphone and a second position of the second earphone; and
determine the first distance according to the first position and the third position, determine the second distance according to the second position and the third position, and determine the third distance according to the first position and the second position.

17. The terminal of claim 10, wherein the one or more programs operable with the processor to determine the first distance between the terminal and the first earphone, the second distance between the terminal and the second earphone, and the third distance between the first earphone and the second earphone are operable with the processor to:
  determine a first RSSI value of a signal between the first earphone and the terminal, and determine the first distance according to the first RSSI value;
  acquire a second RSSI value of a signal between the second earphone and the terminal, and determine the second distance according to the second RSSI value; and
  acquire a third RSSI value of a signal between the first earphone and the second earphone, and determine the third distance according to the third RSSI value.

18. The terminal of claim 10, wherein the one or more programs are further operable with the processor to:
  determine that an RSSI value of a signal between the terminal and the first earphone is less than or equal to a third threshold value before the communication connection between the terminal and the first earphone is disconnected.

19. A non-transitory computer-readable storage medium configured to store computer programs for electronic data interchange (EDI) which, when executed, are operable with a computer to:
  determine a first distance between a terminal and a first earphone of wireless earphones, a second distance between the terminal and a second earphone of the wireless earphones, and a third distance between the first earphone and the second earphone, wherein the terminal is in communication connection with the first earphone and the first earphone is in communication connection with the second earphone;
  disconnect the communication connection between the terminal and the first earphone when the first distance is greater than the second distance and the third distance is greater than or equal to a first threshold value; and
  establish a communication connection between the terminal and the second earphone.

20. The non-transitory computer-readable storage medium of claim 19, wherein the computer programs operable with a computer to establish the communication connection between the terminal and the second earphone are further operable with a computer to:
  send a first paging request at a predetermined frequency band;
  receive a first paging response, wherein the first paging response is sent by the second earphone at the predetermined frequency band in response to the first paging request;
  send to the second earphone a second paging request at the predetermined frequency band, wherein the second paging request carries frequency-hopping sequence information and clock phase information of the terminal, the frequency-hopping sequence information is used for adjusting a frequency band of the second earphone, and the clock phase information is used for adjusting a time-frequency location of the second earphone; and
  receive a second paging response and completing establishing the communication connection, wherein the second paging response is sent by the second earphone at the predetermined frequency band in response to the second paging request.

* * * * *